United States Patent Office 3,296,449
Patented Jan. 3, 1967

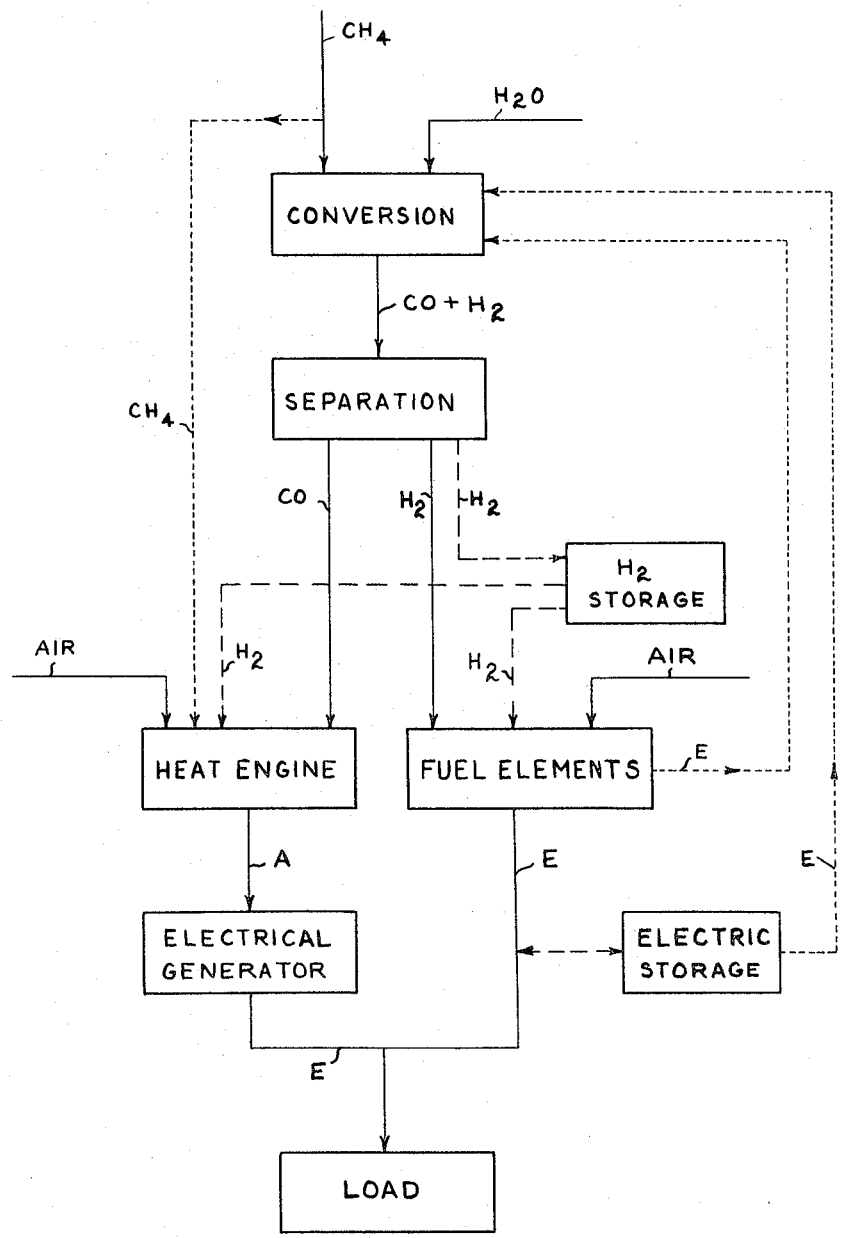

3,296,449
PROCESS FOR THE PRODUCTION OF ELECTRICAL ENERGY FROM THE CHEMICAL ENERGY OF FUELS
Heinz-Günther Plust, Spreitenbach, and Carl Georg Telschow, Zurich, Switzerland, assignors to Aktiengesellschaft Brown, Boveri & Cie, Baden, Switzerland, a joint-stock company
Filed Feb. 10, 1964, Ser. No. 343,728
Claims priority, application Switzerland, Feb. 19, 1963, 2,031/63
9 Claims. (Cl. 290—2)

Various processes are known for producing electrical energy from the chemical energy of solid, liquid and gaseous fuels containing hydrogen and/or carbon. The greatest importance is attached to the use of heat-engines linked to an electrical generator. The efficiency of heat-engines is thermodynamically limited by Carnot's efficiency, and reaches about 40% in practice under the most favourable conditions. Optimum design of the engine for this purpose demands operation under full load, i.e. as a basic-load engine. Since such an engine has no storage capacity, special peak-power engines are required to cover peak energy requirements. On the contrary, if the heat-engine is operated at only part-load, so that it can deliver the required reserve power through the transition to full load, account must be taken of the fact that the efficiency will drop to less than 40% on part-load operation, which will be for most of the time.

As opposed to heat-engines, the chemical energy of a fuel may be converted into electrical energy with considerably higher efficiency—about 80%—by decomposing the fuel in electrochemical fuel elements. The disadvantage of these devices resides in that fuels such as coal, hydrocarbons and oils, which can be technically prepared in simple fashion, can be decomposed to a satisfactory extent only in so-called high temperature fuel elements. However, this form of construction is not suitable for practical use because of the great technological difficulties attendant upon the high operating temperatures of 400 to 800° C. The said technological difficulties do not indeed arise with low-temperature fuel elements. However, the latter permit only relatively expensive fuels such as hydrogen or alcohols to be decomposed with satisfactory efficiency. For reasons of cost, it is consequently not an economical proposition to use fuel elements for the general supply of electrical energy.

The purpose of the present invention, which relates to a process for producing electrical energy from the chemical energy of solid, liquid and gaseous fuels containing hydrogen and/or carbon, is to improve the efficiency of converting chemical energy into electrical energy, and to make it more economical.

The process according to the invention is characterized in that the fuels are converted and separated into hydrogen gas and a combustion gas containing carbon, in that the combustion gas containing carbon is fed to a heat-engine linked to an electrical generator, which engine is operated at least substantially at constant load and at least substantially under conditions of optimum efficiency, and in that the hydrogen gas is at least partially fed to electro-chemical low temperature fuel elements together with a gas containing oxygen.

The invention will be more precisely explained hereinafter with reference to an example which is illustrated in the drawing in the form of a block diagram.

In this example, it is assumed that the gaseous fuel containing hydrogen and carbon is present in the form of natural gas (methane, $CH_4$). In a first step of the process, the natural gas is converted into carbon monoxide (CO) and hydrogen ($H_2$). Suitable processes are known wherein water vapour is used for converting the natural gas.

The next step of the process embraces separating the mixed gas $CO+H_2$ into its two components. In a known process this is done, for example, with the aid of sheets of palladium. A combustion gas (CO), containing the carbon and hydrogen gas ($H_2$) are thus produced by the separation.

The combustion gas (CO) containing carbon is now fed to a heat-engine and caused to react together with air in accordance with the equation $$CO + \tfrac{1}{2}\,O_2 \rightarrow CO_2$$

The mechanical energy A obtained drives an electrical generator by means of which the electrical energy E is produced, the said electrical energy being consumed in an external load. In this connection, the heat-engine is operated at least substantially at constant load and at least substantially under conditions of optimum efficiency. The quantity of combustion gas (CO) fed to the heat-engine is thus at least substantially constant with time.

The hydrogen ($H_2$) produced by the separation is fed to electrochemical low-temperature fuel elements, and decomposed together with a gas containing oxygen, preferably with air, in accordance with the reaction equation $$3\,H_2 + 3/2\,O_2 \rightarrow 3\,H_2O$$

The directly produced electrical energy E is likewise fed to the external load in order to cover the variable part of the energy requirement. The fluctuating energy requirement demands that special measures be taken to regulate the fuel feed or to store electrical energy. In this connection, it must be noted that the quantity of combustion gas (CO), produced by conversion of natural gas, fed to the heat-engine should be constant, so that the quantity of hydrogen gas produced is also constant.

An essential advantage of the process according to the invention resides in that when the load is reduced a considerable quantity of hydrogen gas produced in excess is automatically stored in the electrodes of the fuel elements, and that when the load increases additional hydrogen gas is available in the fuel elements. This property of fuel elements of the $H_2O/_2$ type dispenses in many cases with the need for external storage of either hydrogen or electricity.

When load fluctuations are relatively large or last for a relatively long time, it is advantageous for the hydrogen gas not decomposed by the fuel elements to be stored volumetrically, for example by compression. This modification of the process is diagrammatically illustrated in the drawing by broken lines. When the requirement for electrical energy increases, the stored hydrogen gas may me delivered to the fuel elements in addition to the quantity of hydrogen being produced constantly.

A further advantageous modification resides in feeding to the heat-engine the hydrogen gas not consumed by the fuel elements, and simultaneously throttling the quantity of natural gas fed in so that the operational conditions of the heat-engine do not change.

Furthermore, any electrical energy produced in excess may also be electrochemically stored in known manner, and delivered to the load when required. In this connection, it is particularly expedient to use $H_2/O_2$ fuel elements on account of their large storage capacity.

It will be shown hereinafter, with reference to the example of fuel in the form of natural gas, that efficiency is increased by converting chemical energy into electrical energy by the process according to the invention.

Direct combustion with air of natural gas ($CH_4$), upon which the example is based, takes place in accordance with the reaction equation $$CH_4 + 2\,O_2 \rightarrow CO_2 + 2\,H_2O$$

which is associated with a decease in the free energy (molar enthalpy at constant pressure) of 190.07 kcal. at a temperature of 1000° K. Assuming a heat-engine of optimal design, exhibiting an efficiency of 40% together with an electrical generator, direct combustion of 1 kg. of $CH_4$ accordingly supplies 5.52 kWh. of electrical energy.

In the process according to the invention, various reactions must be taken into account in the energy-balance.

In the first place, the natural gas is converted in the presence of water vapour at 1000° K., in accordance with the reaction equation $$CH_4 + H_2O \rightarrow CO + 3H_2$$

with an enthalpy of $h = +54.08$ kcal. This endothermic reaction must accordingly be fed with 3.93 kWh. per kg. of decomposed $CH_4$. Furthermore, 0.77 kWh. per kg. of decomposed $CH_4$ must be additionally supplied for vaporizing the water.

However, the conversion procedure is not now described solely by the above main reaction, but further balancing reactions occur. Altogether, the following four equations must be discussed, and the molar enthalpy is stated in each of them:

(1) $CH_4 + H_2O \rightarrow CO + 3H_2$     $\Delta h_1 = +54.08$ kcal.
(2) $CH_4 + 2H_2O \rightarrow CO_2 + 4H_2$     $\Delta h_2 = +46.92$ kcal.
(3) $CH_4 + CO_2 \rightarrow 2CO + 2H_2$     $\Delta h_3 = +61.27$ kcal.
(4) $CO + H_2O \rightleftharpoons CO_2 + H_2$     $\Delta h_4 = -7.19$ kcal.

Of these equations, it is essentially equations (1), (2) and (4) which are decisive as regards the composition of the converted combustion gas and the reaction energetics. Since the position of the equilibrium in Equation 4 is given solely by the equilibrium constant $$K_p = [CO_2] \cdot [H_2] [CO] \cdot [H_2]$$

which depends on the concentration values, and its value at above 1000° K. is greater than 0.8, this equilibrium is fairly well on the side of the CO, so that Equation 4 also may be omitted from further consideration.

Equations 1 and 2, which alone are important, may accordingly be expressed by a single equation in the form $$CH_4 + (1+\alpha)H_2O \rightarrow$$
$$(1-\alpha)CO + \alpha \cdot CO_2 + (3+\alpha)H_2 + (1-\alpha)\Delta h_1 + \alpha \cdot \Delta h_2$$

where $\alpha$ is the fraction of Equations 1 and 2 in the total reaction.

Since it is known that conversion takes place almost completely at about 1000° K., and that the composition of the converted gas obtained is 77.4% by volume of $H_2$, 11.1% by volume of CO, 11.1% by volume of $CO_2$ and 0.4% by volume of $CH_4$, the resultant value of $\alpha$, neglecting the undecomposed natural gas $CH_4$, is 0.5. The conversion is thus described by the reaction equation $$CH_4 + 1.5H_2O \rightarrow 0.5CO + 0.5CO_2 + 3.5H_2$$

with an enthalpy of $+50.50$ kcal. Accordingly, reaction heat amounting to 3.66 kWh. per kg. of decomposed $CH_4$ and water-vaporizing heat amounting to 1.6 kWh. per kg. of decomposed $CH_4$ must be supplied for the endothermic reaction to proceed.

In the second place, the combustion gas (CO) present after separation is burnt with air in the heat-engine in accordance with the reaction equation $$CO + \tfrac{1}{2}O_2 \rightarrow CO_2$$

with an enthalpy of $-66.34$ kcal.

Finally, the hydrogen gas present after separation and fed to the low-temperature fuel elements reacts in accordance with the reaction equation $$3H_2 = 3/2 O_2 \rightarrow 3H_2O$$

with an enthalpy of $-173.52$ kcal.

A summary is now given for the electrical energy produced per kg. of decomposed $CH_4$, and the efficiencies of thermal production by means of a heat-engine and generator, or electrochemical production by means of fuel elements, and of thermal-electrochemical production by the process according to the invention. In this connection, it is assumed that the efficiency of the heat-engine together with the generator is 40%, and that of the fuel elements is 80%.

Thermal production
   Heat-engine and generator _____ $+5.52$ kWh.
                                        Efficiency: 40%

Electrochemical production
   Fuel elements _____ $+11.8$ kWh.
   Conversion _____ $-4.84$ kWh.

Electrical energy produced _____ $+6.96$ kWh.
                                        Efficiency: 50.3%

Thermal-electrochemical production
   Heat-engine and generator _____ $+0.98$ kWh.
   Fuel elements _____ $+11.8$ kWh.
   Conversion _____ $-4.84$ kWh.

Electrical energy produced _____ $+7.94$ kWh.
                                        Efficiency: 57.5%

This summary reveals that the process according to the invention is capable of yielding higher efficiencies in producing electrical energy from the chemical energy of fuels than known processes. The energy-balance set out is indeed incomplete. However, since the considerable reaction heat connected with the conversion has been completely deducted in calculation from the electrical energy produced, and all amounts of latent heat have been calculated to the disadvantage of the process, and in particular no allowance has been made in calculation for heat-recovery such as making use of waste heat by means of heat-exchangers, the process always yields efficiencies of considerably over 50%, taking all factors into account.

Although the process comprises a highly endothermic conversion procedure which takes some time until the stable condition is reached, the starting period may be considerably shortened by suitable measures. In the first place, the fuels—natural gas $(CH)_4$ in the example shown—may, as indicated in the drawing by the broken line, with this end in view be fed during the starting period directly to the heat-engine for the purposes of reaction and subsequent production of electrical energy, the conversion procedure being by-passed. Furthermore, since electrochemical low-temperature fuel elements take only a moderate time to warm up, and in addition already contain hydrogen gas stored in their electrodes, they deliver their full electrical output after only a short time. The electrical energy produced is now advantageously used for converting and separating the natural gas, so that the combustion gases CO and $H_2$ are very rapidly available. Should electrochemical devices be provided for the purpose of storing electrical energy, the stored energy is likewise expediently used for converting and separating the natural gas in order to shorten the starting period. These alternative expedients are represented on the drawing by broken lines and legends.

The process has been explained with reference to the example of fuel in the form of natural gas. However, other fuels containing hydrogen and carbon may also be used besides natural gas, for example coal and oils, being converted by known processes with air and water vapour into $H_2$, CO, $CO_2$ and if desired other gases containing carbon. The advantages of high efficiency and economical operation are fully preserved with such fuels also.

We claim:
1. A process for producing electrical energy from chemical energy comprising the steps of providing a supply of gaseous fuel mixture containing a substantially constant ratio of a carbon compound and hydrogen, separating said gas mixture into a portion consisting essentially of hydrogen and a fuel gas consisting essentially of said carbon compound, supplying said fuel gas to a heat engine, supplying at least a part of said portion consisting essentially of hydrogen to said heat engine during at least a part of its operation to maintain said heat engine at substantially constant load and maximum efficiency, connecting said heat engine through an electrical generator to a load, supplying both the remainder of said portion consisting essentially of hydrogen and hydrogen from storage to a low temperature electro-chemical fuel cell during at least a part of its operation, supplying both a part of the remainder of said portion consisting essentially of hydrogen to said fuel cell and the residue of said remainder to a storage during another part of the operation of said fuel cell, supplying oxygen to said fuel cell during said parts of the operation of said fuel cell in order to generate electric energy therein and delivering the resulting energy to said load.

2. Process for producing electrical energy from the variable amount of chemical energy of a variable supply of a fuel containing an element selected from the group consisting of carbon and hydrogen which comprises converting said supply of fuel into a gas mixture containing a substantially constant ratio of a carbon compound and hydrogen, separating said gas mixture into a portion consisting essentially of hydrogen and a fuel gas consisting essentially of said carbon compound, supplying said fuel gas to a heat engine, supplying at least a part of said portion consisting essentially of hydrogen to said heat engine during at least a part of its operation to maintain said heat engine at substantially constant load and optimum efficiency, connecting said heat engine through an electrical generator to a load, supplying at least a part of the remainder of said portion consisting essentially of hydrogen to a low temperature electro-chemical fuel element together with oxygen to generate electricity and delivering the resulting electricity to said load.

3. Process for producing a variable amount of electrical energy from the chemical energy of a substantially constant supply of fuel containing an element selected from the group consisting of carbon and hydrogen which comprises converting said supply of fuel into a gas mixture containing a substantially constant ratio of a carbon compound and hydrogen, separating said gas mixture into a portion consisting essentially of hydrogen and a fuel gas consisting essentially of said carbon compound, supplying said fuel gas to a heat engine to maintain the same at substantially constant load and maximum efficiency and connecting said heat engine through an electrical generator to a load, supplying at least a part of said portion consisting essentially of hydrogen together with oxygen to a low temperature electro-chemical fuel element during at least a part of its operation and delivering the electrical output of said fuel element to said load and storing at least a part of said portion consisting essentially of hydrogen during at least a part of the operation of said low temperature electro-chemical fuel element.

4. Process as defined in claim 2 in which a part of said portion consisting essentially of hydrogen is stored during a part of the operation of said low temperature electro-chemical fuel element.

5. Process according to claim 2, in which a fuel is fed directly to the heat-engine during the starting period.

6. Process according to claim 2 in which during the starting period the energy required for converting and separating the fuel is taken from the fuel elements.

7. Process according to claim 8 in which during the starting period the electrochemically stored energy is used for converting and separating the fuel.

8. Process as defined in claim 2 in which at least a part of the electrical energy produced by said low temperature electro-chemical fuel element is stored electrochemically during at least a part of the operation thereof.

9. Process as defined in claim 3 in which at least a part of the electrical energy produced by said low temperature electro-chemical fuel element is stored electrochemically during at least a part of the operation thereof.

References Cited by the Examiner
UNITED STATES PATENTS

| | | | |
|---|---|---|---|
| 411,426 | 9/1889 | Dahl | 136—86 |
| 1,716,084 | 6/1929 | Percy | 123—3 |
| 1,795,670 | 3/1931 | Odell et al. | 123—3 |
| 3,070,703 | 12/1962 | Podolny | 290—2 |

ORIS L. RADER, *Primary Examiner.*

G. SIMMONS, *Assistant Examiner.*